United States Patent [19]

Fraser

[11] Patent Number: 4,613,744

[45] Date of Patent: Sep. 23, 1986

[54] METHODS OF REPAIR

[75] Inventor: Michael J. Fraser, Birmingham, United Kingdom

[73] Assignee: Refurbished Turbine Components Limited, Worcester, England

[21] Appl. No.: 635,604

[22] Filed: Jul. 30, 1984

[30] Foreign Application Priority Data

Aug. 2, 1983 [GB] United Kingdom ............... 8320836

[51] Int. Cl.⁴ .............................................. H05B 3/36
[52] U.S. Cl. ..................................... 219/200; 219/201; 219/528; 219/549; 219/550; 228/119; 228/231; 228/232
[58] Field of Search ............... 219/200, 528, 548, 549, 219/550, 536, 201; 228/119, 240, 232, 231

[56] References Cited

U.S. PATENT DOCUMENTS

| 1,855,092 | 4/1932 | Browne | 219/528 |
| 3,036,187 | 5/1962 | Goldstaub | 219/550 |
| 3,125,804 | 3/1964 | Thome | 219/528 |
| 3,393,297 | 7/1968 | Hart | 219/528 |
| 4,069,410 | 1/1978 | Keep | 219/528 |
| 4,352,707 | 10/1982 | Wengler | 219/528 |
| 4,504,734 | 3/1985 | Piazzola | 219/536 |

FOREIGN PATENT DOCUMENTS 56-163091 12/1981 Japan ................................ 219/200

Primary Examiner—Clarence L. Albritton
Assistant Examiner—Teresa J. Walberg
Attorney, Agent, or Firm—Parmelee, Miller, Welsh & Kratz

[57] ABSTRACT

A method of repair of an article incorporating the application of considerable thermal energy, e.g. a welding operation, requires heating of the article both in the repair area and surrounds wherein the heating of the repair area and surrounds is carried out by flexible heating mats and wherein fixing means are used to securely fix the heating mats to the article, which fixing means may readily release at least a part of the heating mats whereby that part may be folded back or otherwise removed from the repair area to allow the repair step to be carried out. After repair, that part of the heating mats removed from the repair area may be replaced.

15 Claims, 5 Drawing Figures

METHODS OF REPAIR

BACKGROUND TO THE INVENTION

The present invention relates to a method of repair of, and means for securing heaters to an article and is primarily concerned with articles which are to be repaired by a repair method such as welding or brazing involving the application to the article of considerable thermal energy, and during which it is desirable that the article should be heated by heating means before, during or after the repair step involving the application of considerable thermal energy.

It has been found that the application of heat to an article that is to be repaired by a step involving the application of considerable thermal energy both before, during and after the repair step is beneficial to the repaired life of the article and such treatment has been found to be particularly beneficial in the repair of pipes and turbine blades.

It has been proposed, when repairing articles which require either preheat or heat during a repair step, to use heating mats which may comprise electrically energised heating elements surrounded by electrically insulating material such as ceramic beads, such mats being inherently flexible and being capable of positioning on the surface of an article and conforming closely thereto.

Whereas heating mats of the type described above have been found to be highly suitable to provide heating after a repair step of an article, the problem of securing the mat to the article has in some cases proved impossible and furthermore it has in the past been found necessary to either remove one or more mats in the vicinity of the repair area in order to obtain access to the repair area so that the repair step may be carried out or alternatively not heat the article in the repair area.

SUMMARY OF THE INVENTION

It is an object of the present invention to provide a new or improved method of repairing an article.

According to one aspect of the present invention we provide a method of repairing an article wherein said method of repair involves the application of considerable thermal energy to said article and wherein said article is heated by flexible heating means, characterised in that the heating means is positioned on the surface of the article and releasably held thereon by a plurality of fixing means secured to said article and spaced from each other to enable holding of said heating means at a plurality of spaced positions and in that one or more of said fixing means may be readily undone or otherwise released to enable that part of the flexible heating means in a repair area on the article to be temporarily folded back or otherwise removed from said repair area.

Preferably, the method comprises the further steps of:
(a) first securing the fixing means to the article to be repaired in a secure manner;
(b) positioning the heating means in a desired position on the article;
(c) operating or otherwise manipulating said fixing means to releasably hold the heating means on the surface of said article.

Conveniently, the fixing means, on removal of said part of the heating means from the repair area, may be subsequently re-secured to maintain the heating means in its folded back or otherwise removed position.

By enabling a significant part of the heating means to remain on the article, heat may still be imparted to the article to be repaired and following the repair step the heating means may be re-positioned so as to apply heat to the repair area of the article.

According to another aspect of the present invention, we provide a method of repairing an article, which repair involves the application to the article of considerable thermal energy, said method including the provision of heating means to heat the article in a controlled manner:
(a) before said repair step is carried out;
(b) during said repair step;
(c) after said repair step; characterised in that the method further comprising the steps of:
1. the provision of fixing means to hold said heating means to said article including the area to be repaired, in a manner to ensure secure holding of the heating means on the surface of said article and which fixing means also enables removal of the heating means therefrom;
2. energising the heating means to heat the article in a controlled manner to a desired temperature;
3. removing the heating means from only a repair area;
4. carrying out said repair step involving the application of considerable thermal energy while maintaining application of heat by said heating means to the other heated part of said article;
5. replacing the heating means in the repair area;
6. heating the article, including the repair area in a controlled manner.

Preferably the method further includes the step of securing temperature sensing means to the article at least in the region of said repair area to facilitate control of said heating means. Conveniently said temperature sensing means may comprise thermocouples and may be connected to control means adapted to control the amount of energy supplied to said heating means in accordance with the temperature sensed by said thermocouples.

Preferably the heating means comprise resistive elements through which current is passed and conveniently said resistive elements are covered or otherwise surrounded by a plurality of ceramic beads.

Preferably the fixing means may comprise wire-like members secured to the article by any suitable means and, in the case of a metallic article, may be secured to the article by means of welding, all the wires being secured to the article and so positioned such that the heating means, which preferably comprises heating mats as described above, may pass between a pair of such wires which may then be twisted or otherwise secured together to maintain the heating mat in position. Alternatively, a single heating mat may be provided.

The or each heating means in the vicinity of the repair area and which has to have a part moved from the repair area during a repair step is preferably provided with a plurality of pairs of such wires so that a part of said heating mat may be removed from the repair area while the heating mat is still retained in position by another pair or pairs of wires.

Due to the inherent flexibility of heating mats as above described, the part of the mat in the repair area may be folded back over another part of the heating mat and the wires may then be reconnected to each other to maintain the mat in such position.

After the repair step has been carried out and access to the repair area is no longer required, the heating mat may be replaced by once more undoing the wires allowing return of the heating mat or moving the heating mat to its original position and re-securing the wires together to maintain the heating mat in that position.

In the case of some articles, bands may be secured at spaced intervals along the article and "bridge" members provided, the "bridge" members having a pair of end portions securable under adjacent bands, a central part of the "bridge" member bearing on a heating mat to maintain it in position.

The method of repair and method of retaining the heating means of the present invention provides a significant advantage in the repair of articles since it will be appreciated that it is only articles subjected to extreme conditions or articles made from particularly sensitive types of material where such care in repair steps is necessary.

As aforementioned, methods of the present invention have been found to be particularly suitable for the repair of turbine blades whereby the blades may be left in situ on the rotor or stator assembly and, whereas in the past the repair of a damaged blade would either:

(a) have necessitated the removal of the blade from the stator or rotor assembly, in itself a very time consuming and costly step; or (b) resulted in a repair step which in the past has been found to be unsatisfactory since the necessary heat control, both before, during and after the repair step, was not possible and furthermore damage during the repair step could also be experienced by turbine blades adjacent to the blade being repaired.

The method of securing the heating means to the turbine blade is of prime importance where access room is restricted since the securing of the heating means must necessarily take up as little room as possible and, not only securely fix the heating means to the article to be repaired but must be capable of easy removal to enable the heating means to be folded back or otherwise moved from the immediate area of the repair to allow the repair to be carried out. It is then necessary that the heating means can be quickly, as soon as the repair step has been carried out, returned to the repair area before any undesirable cooling of the repair takes place which may lead to heat related stress and premature failure of the article in subsequent use.

Furthermore, the method of repairing an article, the subject of the present invention enables a considerable number of different heating means to be secured to an article thereby enabling the application of different amounts of heat at different areas which, when effectively controlled in a desired manner minimises the adverse effects of the application of considerable thermal energy to the article during the repair step.

BRIEF DESCRIPTION OF THE DRAWINGS

The invention will now be described by way of example only with reference to the accompanying drawings wherein.

DESCRIPTION OF THE PREFERRED EMBODIMENTS

Figure 1:
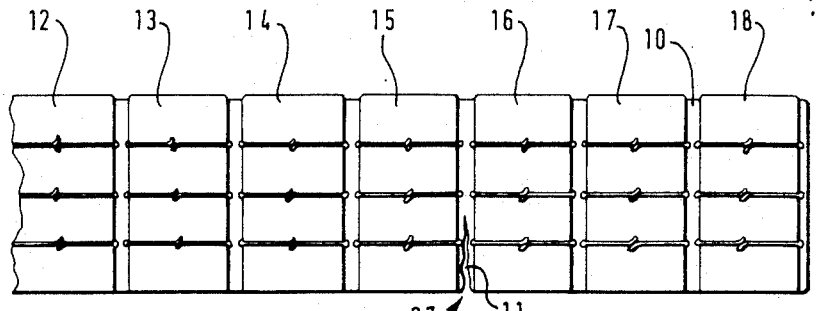
FIG. 1 is a diagrammatic illustration of a turbine blade to which a plurality of heating means have been affixed.

Referring first to FIG. 1, an article to be repaired comprises a turbine blade 10 in which a crack 11 has been formed and which it is required to repair using a repair step involving the application of substantial thermal energy such as welding.

It has been found to be beneficial in order to minimise the occurrence of stress on a blade to preheat the turbine blade 10 in a controlled manner to a predetermined temperature. Electrically energised heating mats such as those shown at 12 to 18 have been found to be particularly suitable.

Figure 2:
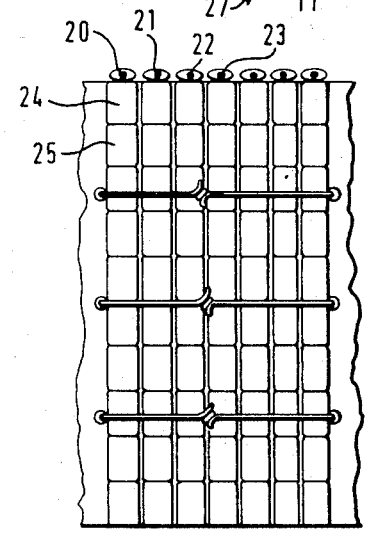
FIG. 2 is a detailed view of one of the heating means and fixing means shown in FIG. 1.

The heating mats as shown at 12 to 18 have an inherent ability to conform to the shape of an article endowed by making the mats from a plurality of conductive elements, as can be seen at 22, 23 in FIG. 2, which elements are surrounded by ceramic beads such as those shown at 24 and 25.

In the past it has been usual, when it is required to carry out a repair step involving the application of considerable thermal energy such as welding, to either omit the mats from the weld area or remove the mats adjacent the weld area, for example the mats 15 and 16, in order that the welding or other repair may be carried out. During the application of considerable thermal energy the area 27 around the crack 11 will be heated by the welding process to a temperature considerably higher than that to which the blade 10 has been raised by the heating means. However, the area designated by arrow 28 which will no longer be heated if the heating mats 15 and 16 are removed, and is likely to cool to a temperature lower than that which was maintained by the heating mats 15 and 16, thus placing the coolest part of the blade 10 nearest the hottest part 27 which is likely to give rise to stress in the blade after repair due to excessive temperature gradient.

It has been found that by providing each of the heating mats 12 to 18 with a plurality of fixing means, the part of the heating mat in the repair area and preventing access to the repair area may be released by undoing some of the fixing means to allow access to the repair area and, after the heating mats are folded back and maintained in this position by the fixing means, the repair may be carried out.

Figure 3:
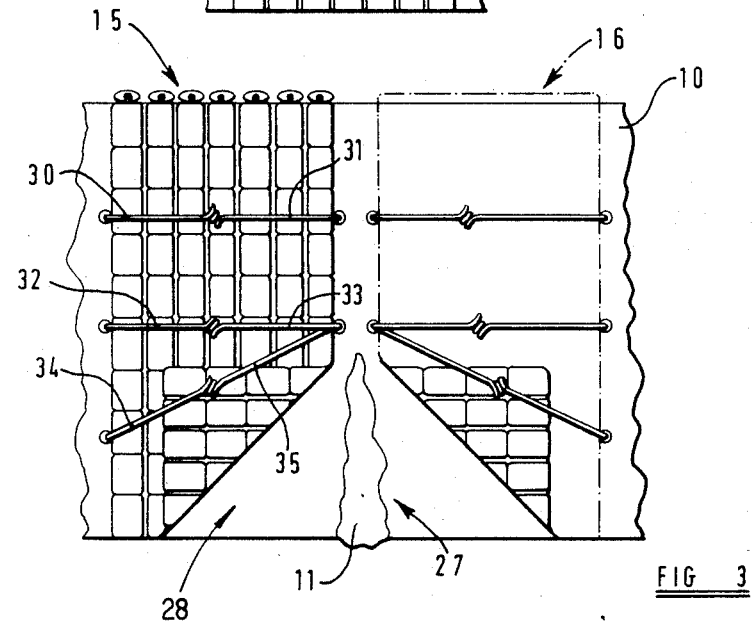
FIG. 3 is a view of part of FIG. 1 in which the heating means have been partially removed and retained by the fixing means.

The fixing means shown in FIGS. 1, 2 and 3 comprise wires, for example those shown at 30 and 31, which have one end welded to the blade 10 and, after positioning the heating mat 15, are twisted together to maintain the heating mat in position.

The heating mat 15 is provided with a second pair of wires 32 and 33 which are similarly twisted together to maintain the mat in position, and a third pair of wires 34 and 35 may be provided and when the mat is laid in position on the blade they may be twisted together to maintain the mat 15 in the position as shown in FIG. 1. After the blade has reached its predetermined desired temperature, a corner 36 of the mat may be folded over, as shown in FIG. 3, and retained in this position by securing the wire 34 onto the wires 32 and 33.

By carrying out a similar folding arrangement of the mat 16, the repair area 27 around the crack 11 is unhindered by the heating mats 15 and 16 which still serve to heat a significant part of the blade 10.

Figure 4:
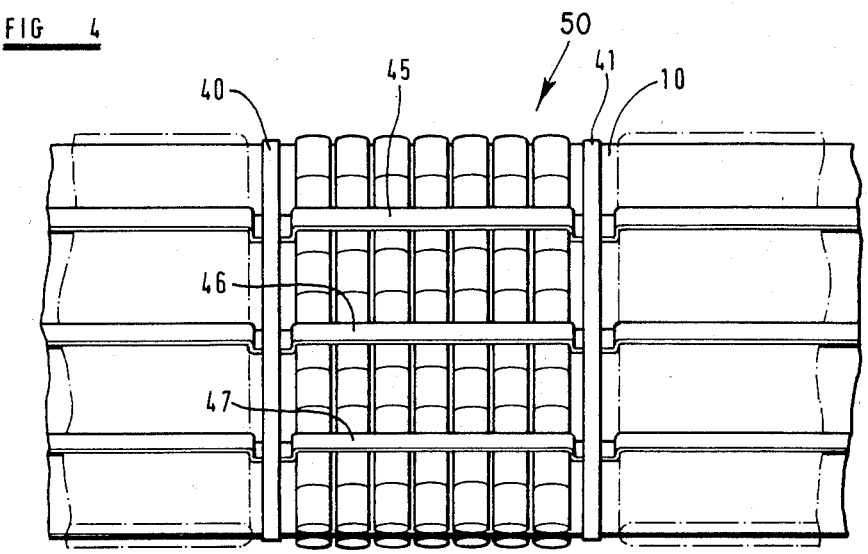
FIG. 4 is a diagrammatic view of a turbine blade provided with heating means and a second embodiment of fixing means.
Figure 5:
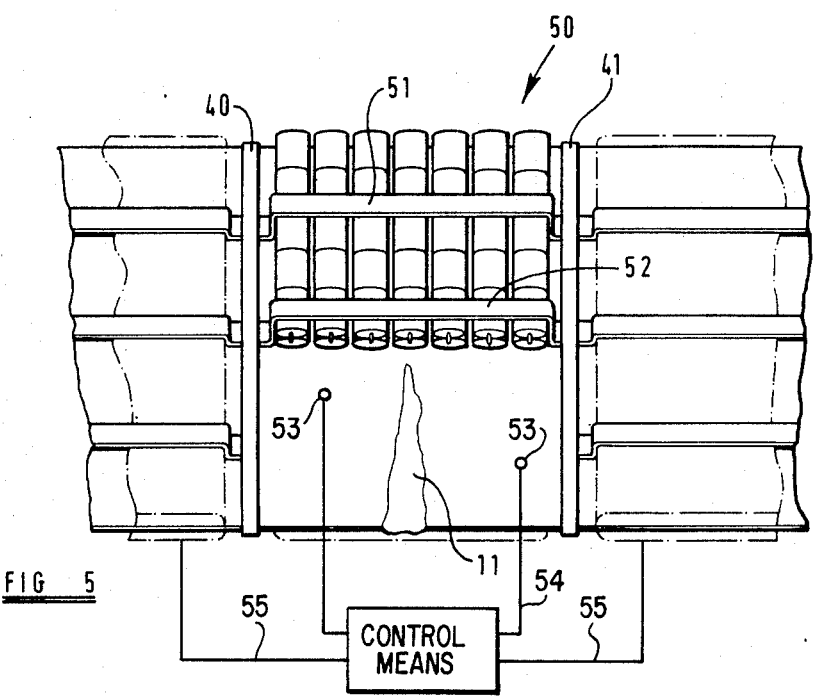
FIG. 5 is an enlarged view of part of the blade shown in FIG. 4 in which a part of one of the heating means has been folded back to allow for repair of the blade.

Referring now to FIGS. 4 and 5, an alternative form of fixing means is illustrated, the fixing means comprising a plurality of bands, two of which are shown at 40 and 41 and bridge members such as those shown at 45,46 and 47. The ends of the bridge members 45,46 and 47 are located underneath the bands [40] and [41.] Alternatively, each end portion of the bridge members may overlie a respective band and be provided with a hook engaged beneath the band.

When the blade 10 has been preheated by the heating mats and has arrived at a predetermined temperature at which it is desired to carry out a welding operation to repair a crack, for example such as the crack 11, the bridge members 46 and 47 are removed, the mat 50 is folded back, as shown in FIG. 5, and different bridge members 51 and 52 which accommodate the double thickness of mat are placed in position with their end portions beneath bands 40 and 41, thus removing that part of the mat from the weld area 27 around crack 11.

Once again, after the repair has been carried out on the crack 11 and access is no longer required, then the mat 50 may be replaced in position as illustrated in FIG. 4 so that a post welding stress relief treatment may be carried out by the heating mats.

As previously described, and schematically illustrated in FIG. 5, temperature sensing means, such as thermocouples 53 (only two being shown) may be secured to the article at least in the region of the repair area, which temperature sensing means are connected, such as by leads 54 to a control means, which control means is adapted to control the amount of energy supplied to the heating means, such as through leads 55 (only two being shown), in accordance with the temperature sensed by the temperature sensing means.

Whilst the present invention has been described primarily in relation to the heat treatment and repair of turbine blades for which the fixing means of the present invention has been found to be particularly applicable, it is envisaged that the fixing means are equally applicable to any article, for example pipes, which it is desired to heat by flexible heating mats, a part of which has to be subsequently and temporarily removed to enable access to a part of the article.

The features disclosed in the foregoing description, or the following claims, or in the accompanying drawings, expressed in their specific forms or in terms of a means for performing the disclosed function, or a method or process for attaining the disclosed results, or the class or group of substances or compositions, is appropriate, may separately or any combination of such features, be utilized for realising the invention in diverse forms thereof.

I claim:

1. A method of repairing an article wherein said method of repair involves the application of considerable thermal energy to said article and wherein said article is heated by flexible heating means comprising:
    positioning the flexible heating means on the surface of the article;
    releasably holding said flexible heating means on the surface of the article by a plurality of fixing means secured to said article, and spaced from each other to enable holding of said flexible heating means at a plurality of spaced positions, such that at least one of said fixing means may be readily moved to enable that part of the flexible heating means in a repair area on the article to be temporarily removed from said repair area.

2. A method as claimed in claim 1 comprising the further steps of:
    (a) first securing the fixing means to the article to be repaired in a secure manner;
    (b) positioning the heating means in a desired position on the article;
    (c) operating said fixing means to releasably hold the heating means on the surface of said article.

3. A method as claimed in claim 2 characterised in that said fixing means, on removal of said part of the heating means from the repair area, may be subsequently re-fastened to maintain the heating means in its removed position.

4. A method of repairing an article as claimed in claim 1, which repair involves the application to the article of considerable thermal energy, said method including the provision of heating means to heat the article in a controlled manner;
    (a) before said repair step is carried out;
    (b) during said repair step;
    (c) after said repair step; characterised in that the method further comprising the steps of:
    1. providing fixing means to hold said heating means to said article including the area to be repaired, in a manner to ensure secure holding of the heating means on the surface of said article and which fixing means also enables removal of the heating means therefrom;
    2. energising the heating means to heat the article in a controlled manner to a desired temperature;
    3. removing the heating means from only a repair area;
    4. carrying out said repair step involving the application of considerable thermal energy while maintaining application of heat by said heating means to the other heated part of said article;
    5. replacing the heating means in the repair area;
    6. heating the article, including the repair area in a controlled manner.

5. A method as claimed in claim 4 characterised in that at least one of said heating means extends over the surface of an article to be repaired including a surface part where heating must be continued during the repair step involving the application of considerable thermal energy and a repair area, and in that at least one of said fixing means may be released to permit of removal of the part of said heating means covering said repair area and in that said heating means can be folded and secured to a part of the surface of the article where heating is to be continued during said repair step by another of said fixing means.

6. A method of repair as claimed in claim 5 characterised in that said method includes the step of securing temperature sensing means to the article at least in the region of said repair area and sensing the temperature of said article and thereby controlling the energisation of said heating means.

7. A method of repair as claimed in claim 6 characterised in that said temperature sensing means comprises thermocouples connected to control means adapted to control the amount of energy supplied to said heating means in accordance with the temperature sensed by said thermocouples.

8. A method of repair as claimed in claim 7 characterised in that said heating means comprises resistive elements through which current is passed said resistive elements being covered by electrically insulating material.

9. A method of repair as claimed in claim 8 characterised in that said fixing means comprises wire-like members secured to the article by welding, said wire-like members being secured to the article and positioned such that the heating means may pass between a pair of such wire-like members which may then be twisted or otherwise secured together to maintain the heating means in position.

10. A method of repair as claimed in claim 9 characterised in that at least one heating means in the vicinity of the repair area, which heating means has to have a part moved from the repair area during a repair step, is provided with a plurality of pairs of such wire-like members so that a part of said heating means may be removed from the repair area while the heating means is still retained in position on the article by at least one other pair of wire-like members.

11. A method of repair as claimed in claim 8 characterised in that said fixing means comprise bands secured at spaced intervals along the article and wherein said fixing means further comprises "bridge" members, said "bridge" members having a pair of end portions securable under adjacent bands, a part of the "bridge" member bearing on the heating means to maintain it in position on the article.

12. A method of repair as claimed in claim 4 characterised in that said application of considerable thermal energy comprises a welding operation.

13. A method of repair as claimed in claim 4 characterised in that said application of considerable thermal energy comprises a brazing operation.

14. A method of repair as claimed in claim 4 characterised in that the article to be repaired comprises a turbine blade.

15. A method of repair as claimed in claim 14 characterised in that said method of repair includes the welding of a crack in the repair area.

* * * * *